United States Patent
Johnson et al.

(10) Patent No.: US 8,202,822 B2
(45) Date of Patent: Jun. 19, 2012

(54) METHOD OF IMPROVING PLANT GROWTH AND PLANT GROWTH COMPOSITION

(75) Inventors: Louis B. Johnson, Troy, AL (US); Jeffery L. Peel, Malvern, AL (US)

(73) Assignee: Accelegrow, Inc., West Point, GA (US)

( * ) Notice: Subject to any disclaimer, the term of this patent is extended or adjusted under 35 U.S.C. 154(b) by 116 days.

(21) Appl. No.: 12/449,297

(22) PCT Filed: Feb. 4, 2008

(86) PCT No.: PCT/US2008/001442
§ 371 (c)(1), (2), (4) Date: Jul. 31, 2009

(87) PCT Pub. No.: WO2008/097501
PCT Pub. Date: Aug. 14, 2008

(65) Prior Publication Data
US 2010/0105554 A1    Apr. 29, 2010

Related U.S. Application Data

(63) Continuation-in-part of application No. 12/285,542, filed on Oct. 8, 2008, now Pat. No. 8,138,228, which is a continuation-in-part of application No. 11/211,424, filed on Aug. 26, 2005, now abandoned.

(60) Provisional application No. 60/899,046, filed on Feb. 2, 2007, provisional application No. 60/610,202, filed on Sep. 16, 2004.

(51) Int. Cl.
*A01N 59/00* (2006.01)
*C05D 9/00* (2006.01)

(52) U.S. Cl. ............... 504/123; 504/125; 71/31
(58) Field of Classification Search ............... None
See application file for complete search history.

(56) References Cited

U.S. PATENT DOCUMENTS

| | | | |
|---|---|---|---|
| 5,496,568 A * | 3/1996 | Winston | 424/717 |
| 5,792,467 A * | 8/1998 | Emerson et al. | 424/405 |
| 6,251,878 B1 | 6/2001 | Strickland et al. | |
| 6,410,498 B1 | 6/2002 | Smets et al. | |
| 6,458,546 B1 | 10/2002 | Baker | |
| 2002/0053229 A1 | 5/2002 | Varshovi | |
| 2003/0167683 A1 * | 9/2003 | Moore et al. | 47/48.5 |
| 2005/0234041 A1 | 10/2005 | Tomazic et al. | |
| 2005/0288188 A1 | 12/2005 | Volgas et al. | |
| 2007/0020342 A1 | 1/2007 | Modak et al. | |

OTHER PUBLICATIONS

SeaCrop Soluble Kelp Powder (SeaCrop Liquid Kelp ExtractTM, retrieved on Mar. 27, 2008 via online www.archive.org/web/19990423150329/http://www.noamkelp.com/solpowder.html, dated on Apr. 23, 1999.

* cited by examiner

*Primary Examiner* — Alton Pryor
(74) *Attorney, Agent, or Firm* — Clark & Brody

(57) ABSTRACT

A method of fertilizing plants and/or seeds involves the application of a growth hormone free formulation of fertilizer and sarcosine, either together as a formulation or separately. The sarcosine is used in an effective amount to enhance plant biomass development and fertilizer uptake. The application method and composition can also include the application of a preservative.

14 Claims, No Drawings

METHOD OF IMPROVING PLANT GROWTH AND PLANT GROWTH COMPOSITION

This application is a National Stage Entry of PCT/US2008/001442 filed Feb. 4, 2008, which claims priority of Provisional Application No. 60/899,046, filed Feb. 2, 2007 and is a continuation-in-part of application Ser. No. 12/285,542 filed Oct. 8, 2008, now U.S. Pat. No. 8,138,228, which is a continuation of application Ser. No. 11/211,424, now abandoned, filed Aug. 26, 2005, which claims benefit of Provisional Application No. 60/610,202, filed Sep. 16, 2004, all of which is incorporated herein by reference.

TECHNICAL FIELD

The present invention relates to an improvement in the application of fertilizers to plants and seed, and more particularly to the inclusion of sarcosine in an effective amount for the purpose of increasing the biomass of the plant during growing.

BACKGROUND ART

The use of fertilizers to improve plant and seed growth is well known. Various ingredients can be used to make up the fertilizer, including the typical elements of nitrogen, potassium, and phosphorous, and micronutrients such as boron and the like, as well as various filler materials such as sodium sulphate, talc, clay, calcium carbonate, bentonite, silica, diatomaceous earth, metal oxides such as titanium dioxide, sulfur powder, slow release agents, and water swellable polymers. Kelp with its natural growth hormones as well as other synthetic growth hormone formulations are other viable candidates for use with fertilizers. Examples of natural growth hormones are cytokinins, auxins, and gibberellins. One example of a synthetic growth hormone is Technical Kinetin, which is sold as 98.5 wt. % cytokinin and 1.5 wt. % other ingredients, and is available from Stoller USA of Houston Tex. Other materials from Stoller USA that are synthetic growth hormones include Technical Gibberellic Acid ($GA_3$), which contains 92 wt. % of gibberellic acid and 8 wt. % other ingredients material, and Indole-3-butyric Acid, which contains 99 wt. % indole-3-butyric acid (auxin) and 1 wt. % other ingredients. Other synthetic growth hormones include abscisic acid (ABA), jasmonic acid, ethylene, 1-naphthylacetic acid (NM), brassinosteriods, salicylic acid (SA), oligogalacturonides (pectin-derived polymers), xyloglucan (hemicellulose-derived polymers), and benzyladenine (BA). It should be understood that the Stoller USA products and those recited above are only examples of the types of synthetic hormones that others are commercially available.

There is always a need for improved fertilizer products and methods of application to improve the growth of plants and seed as well as other forms of vegetation and the like.

The present invention has responded to this need by the discovery that sarcosine provides unexpected benefits in terms of plant biomass growth when used in an effective amount with a fertilizer.

SUMMARY OF THE INVENTION

One object of the present invention is an improved method of fertilizing vegetation.

Another object of the invention is a method of fertilizing that employs the use of effective amounts of sarcosine to improve plant biomass growth as well as an optional preservative to retard the growth of mold, fungi, and/or bacteria in the fertilizer.

Yet another object is a method of improving plant growth by applying the sarcosine-containing fertilizer to plant or seed, either directly or indirectly.

A further object of the invention is a method of improving plant growth by applying a fertilizer and sarcosine to plants or seed separately.

Other objects and advantages will become apparent as a description thereof proceeds.

In satisfaction of the foregoing objects and advantages, the invention is an improvement in fertilizer formulations and their use by the presence of an effective amount of sarcosine to increase the biomass of the plant during growing and an optional preservative, the preservative amount effective to retard growth of bacteria, fungi, and/or mold in the fertilizer formulation. The sarcosine component preferably ranges from zero and up to 10.0% by weight of the formulation, more preferably between 0.25% and 3.0% or 5.0%, and most preferably between 0.5 to 1.5%.

The preservative is preferably a food grade preservative and/or the preservative is in a range of from 0.10 to 1% by weight, more preferably between 0.15% and 0.5%, and most preferably around 0.2-0.3%. The preservative is preferably one of methyl paraben, propyl paraben, and diazolidinyl urea.

The formulation can also include an effective amount of a surfactant for wetting purposes, preferably a nonionic surfactant such as an alcohol ethoxylate. The alcohol ethoxylate preferably has 9 or more moles of ethoxylation.

The fertilizer formulation can also include a source of nitrogen, phosphorous, or potassium, and if nitrogen is used, it is preferred to use a compound containing ammonia or urea.

The invention entails the method of using the formulation wherein the fertilizer formulation is applied to plants, for example, by direct application to the plants themselves, or seeds, and includes application to the foliage and/or roots of the plants, to the soil in the vicinity of the plants, and to the seeds themselves.

The use of sarcosine in combination with a fertilizer distinguishes it from its use as an enzyme inactivating component when in the presence of growth hormones such as those found in kelp or present synthetically in a formulation. That is, the sarcosine is believed to be beneficial for plant growth besides inhibiting the breakdown of the hormones found in kelp. As a plant growth enhancer, the sarcosine can be combined with just a fertilizer so that the formulation is growth hormone-free, i.e., does not include a growth hormone, either in a natural form or a synthetic form. In this regard, the sarcosine is physically combined with the fertilizer to be present in the claimed effective amount, either by combining an amount of the sarcosine with the fertilizer prior to application or treating the plants or seeds with fertilizer and sarcosine without combining the two together beforehand. The combining can be done from a solid or liquid perspective as can the separate application of the two components. The formulation of the sarcosine and fertilizer can be applied to plants and/or seeds in any known formulation techniques. For example, the sarcosine and fertilizer could be made into a solution and applied wet, or applied separately. The combination of sarcosine and fertilizer can be in solid form as well for application to plants and/or seeds.

DESCRIPTION OF THE PREFERRED EMBODIMENTS

One embodiment of the invention is the use of sarcosine or methyl glycocoll aminoacetic acid to enhance plant growth by its combination with a fertilizer, but without the need for a growth hormone.

It is believed that the use of sarcosine as a component in the presence of the growth hormones, natural or synthetic, or even just a fertilizer, produces another benefit in terms of improved plant growth and a better quality plant. While it has been previously used as a stabilizing component or an enzyme inactivating component when combined with a naturally occurring growth hormone, see United States Published Patent Application No. 2006-0053851 to Johnson, herein incorporated by reference, it is also believed that sarcosine has active qualities in terms of plant growth on its own, including use in a foliar fertilizer application. That is, the use of an effective amount of sarcosine in combination with a fertilizer means that the fertilizer ingredients are delivered to the plant via the leaf with unparalleled efficiency while at the same time maintaining the leaf system integrity. More particularly, it is believed that the sarcosine binds to the cuticle layer that surrounds the leaf and provides protection thereto. This presence of the sarcosine also temporarily allows an effective transfer of foliar fertilizer elements through the protective cuticle layer. The cuticle layer is important to plants as it protects them from losing excess moisture through the leaves as well as forming a barrier against fungal, bacterial, and viral agents. If the layer is permanently damaged or altered, the plant must rebuild this layer while remaining susceptible to attack from the agents mentioned above. In addition, risk exists from localized burning and transpirational shock through excessive moisture loss. Many of the prior art wetting and delivery agents damage the cuticle layer, which then requires rebuilding by the plant. The sarcosine, while altering the cuticle layer to allow fertilizer penetration, does not damage it, and upon evaporation, the cuticle layer returns to its natural and protective state.

While the fertilizer is able to penetrate the cuticle layer using the invention, the fertilizer also has to pass through the plasma membrane while simultaneously maintaining the membrane's stability to ensure a maximum fertilizing effect. The sarcosine is believed to maintain the stability of the plasma membrane so as to allow full transfer of the foliar fertilizer elements into the plant via the leaf structure. If the stability or the electrical charge of this membrane is not correctly maintained for the full duration of the transfer, then only limited amounts of the fertilizer will penetrate the membrane for plant utilization. The sarcosine is advantageous in that it allows for both cuticle permeability and maintenance of the stability of the plasma membrane. By having these characteristics, the fertilizer is safely and accurately delivered to the plants with minimal or an absence of burning or other damage to the plant.

In addition, the use of sarcosine with the growth hormones in kelp has resulted in surprising results in terms of increased biomass, particularly root mass and increased ground penetration, an increase in the return of carbon to the soil, and enhancing air quality by increased use of carbon dioxide by plants. Using the sarcosine-containing kelp formulation also has shown improvements in the quality of the grown crop, e.g., higher proteins, increased sugars and minerals, better sustainability, etc.

Particular studies were conducted on corn and these studies have shown significant increases in the dry mass of corn stalks and ears when corn is treated with the liquid kelp formulation containing the sarcosine and preservative. For stalk, it has been observed that dry mass was increased on the order of 147%, and the ear dry mass was increased on the order of 109%. For root masses, it has been observed that root masses have increased greatly in weight after treatment with the sarcosine-containing kelp formulation, with some instances as much as a twofold increase. Increases in ground penetration of the root masses have also been observed.

It is postulated that the reason for this increase in plant production relates to the Calvin cycle and the increased stacking of carbon molecules during the cycle. It is known that carbon molecules stack during the Calvin cycle in the process of producing sugars for plant use. The presence of the sarcosine is believed to increase the stacking of carbon molecules and this stacking results in increasing sugar production and an increase in the biomass of the plant. The increase in biomass in turn increases crop yield and enhances the quality of the crops.

It is also believed that during the Calvin cycle, the use of the sarcosine-containing kelp formulation adds to the stability of the Calvin cycle, thus producing more stable molecules. This improved stability allows the plant to be more efficient during the Calvin cycle, thus using lesser quantities of water and not requiring as high of a light intensity. More organic acids accumulate at night and less breakdown occurs during the day.

Given the effect of the kelp-sarcosine-preservative formulation on the Calvin cycle, it is believed the sarcosine is a valuable contributor to the formulation and the benefits of growth are just not related to the use of the kelp. The reason for this thinking is that the results associated with the kelp-sarcosine formulation provide improvements that are beyond just the use of kelp; meaning that the sarcosine has a definite impact on growth, particularly biomass growth. Therefore, improvements in plant growth would be realized when a typical plant fertilizer, without a growth hormone (natural such as found in kelp and/or synthetic as sold by Stoll), is applied to the plant with the sarcosine and optionally the preservative.

The application according to the invention could have the fertilizer combined with the sarcosine and preservative, if present, or the fertilizer could be applied separately from the sarcosine and preservative, if present. As well, the application of the material to plants/seeds could be performed in the manners described for the liquid kelp formulations described in the Johnson published patent application. The fertilizer can be any type that contains one of nitrogen, phosphorous, or potassium and examples include those containing ammonia and urea. The fertilizer can also incorporate one or more of an insecticide, a fungicide, or an herbicide when used with the sarcosine so as to provide the added benefits of these agents with the desired fertilizing effect.

Again, it should be understood that the preservative is an optional component. While the preservative is preferred when kelp is present, since the inventive formulation does not require a growth hormone, the presence of a preservative for the benefit of the kelp is not necessary, although it still can have some desirable preservative benefits with respect to the fertilizer and may be useful in certain applications. Also, sarcosine itself does not require the presence of a preservative.

The amount of sarcosine in combination with the fertilizer can range up to an amount that would be effective for its intended purpose but not such an amount that would damage the plant or other vegetation or seed being treated. It is believe that amounts up to 20% by weight would benefit the plant without doing harm. More preferred upper limits would be about 5-15%, and this amount will also vary depending on the plant species. More preferred ranges include between 0.1 and 5.0%, and even more preferably, between 0.25 or 0.5 and 1.5%. The amounts of the other components such as the preservatives and the surfactants are believed to track those amounts used in the embodiments above.

The fertilizer may also include known fillers such as sodium sulphate, talc, clay, calcium carbonate, bentonite, silica, diatomaceous earth, metal oxides such as titanium dioxide, sulfur powder, a slow release agent, and water swellable polymers.

The term "plants" in the context of fertilizing plants in the absence of a growth hormone but with the sarcosine-containing fertilizer is intended to encompass any and all vegetation in this regard that would benefit from application of the inventive formulation. Examples includes vegetables, legumes, flowers, shrubs, trees, grasses, fruits, vines, etc., and their roots in the event that the formulation is used as a root dip or applied to soil to improve root structure. The inventive formulation could also be employed to treat seeds, e.g., coating or treating the seeds with the formulation by spraying, immersing, or the like.

In instances where the formulation would be used on food bearing plants, it is important to ensure that any additives are food safe. In this regard, if the formulation is in a liquid form and is intended to be sprayed on plants or other vegetation or come into contact with any vegetation that may be eaten or bear fruit, the preservative, if used, should be a food grade preservative such as the methyl or propyl parabens mentioned above.

Fertilizing additives or agents provide nitrogen, phosphorous, or potassium, or micronutrients such as those containing trace elements like iron (Fe), manganese (Mn), zinc (Zn), copper (Cu), boron (B), molybdenum (Mo), cobalt (Co), nickel (Ni), and chlorine (Cl). One example would be an amount of ammonia and/or urea to provide additional nitrogen. The amount should be sufficient to have an effect on the treated plants, with a preferred amount being up to about 10.0% by weight of the formulation, and more preferably 5-10% by weight. One example would be a fertilizer formulation of 3-3-3 of nitrogen, phosphorous and potassium.

In making a liquid formulation, it is preferred to dissolve the preservative, if used, into the water first while taking the necessary precautions to avoid inhaling any of the preservative, and then add the remaining components, although the components could be added in any order if so desired.

A liquid fertilizer formulation can be made in a concentrated form which could be diluted by the end user, or in a ready to use concentration, with either of these modes of delivery well known in the art. When making a concentrate, the weight percentages of the various additives would be adjusted so that when the concentrate is diluted, the percentages still fall within the ranges given above for the broad and more preferred embodiments of the invention.

The manner of application of the liquid fertilizer formulation can be any type known in the art. For example, the formulation can be used as a foliar spray, or for dipping plant roots, or applied directly to soil so that the formulation can interact with roots of the plants in the soil, or for treating seeds such as by coating, immersion, or the like.

It should also be understood that the formulation can include one or more surfactants or sugars for wetting if so desired. When using a surfactant/sugar, virtually any surfactant/sugar that imparts wetting to the formulation can be used. A preferred class of surfactants includes nonionic types such as alcohol ethoxylates, with preferred moles of ethoxylation being about 9 or more. Preferred sugars would include molasses, particularly feed grade molasses, corn syrup, processed sugar, and the like.

As such an invention has been disclosed in terms of preferred embodiments thereof, which fulfills each and every one of the objects of the invention as set forth above, and provides a growth hormone free formulation and method of fertilizing that combines sarcosine and a fertilizer to improve growth for plants, seeds, and the like.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. In a method of improving plant growth by applying a fertilizer to a plant or seed, the improvement comprising using a growth hormone-free fertilizer and including with the growth hormone-free fertilizer an effective amount of sarcosine to increase the biomass of the plant during growing and optionally a preservative in an amount effective to retard growth of bacteria, fungi, and/or mold in the fertilizer.

2. The method of claim 1, wherein the sarcosine ranges from more than zero and up to 20.0% by weight of the fertilizer.

3. The method of claim 2, wherein the sarcosine ranges between 0.25 and 3.0%.

4. The method of claim 1, wherein the preservative is present.

5. The method of claim 4, wherein the preservative is a food grade preservative and the preservative is in a range of from 0.10 to 1% by weight.

6. The method of claim 5, wherein the preservative is in the range of from 0.10 to 1.0% by weight.

7. The method of claim 4, wherein the preservative is one of methyl paraben, propyl paraben and diazolidinyl urea.

8. The method of claim 1, further comprising an effective amount of a surfactant for wetting purposes.

9. The method of claim 8, wherein the surfactant is an alcohol ethoxylate.

10. The method of claim 9, wherein the alcohol ethoxylate has 9 or more moles of ethoxylation.

11. The method of claim 1, wherein the fertilizer includes a source of nitrogen, phosphorous, or potassium, and/or one or more micronutrients, and optionally one or more of an insecticide, a fungicide, and an herbicide.

12. The method of claim 11, comprising ammonia or urea as the source of nitrogen.

13. The method of claim 1, wherein the fertilizer and sarcosine are combined prior to applying to the plant or the seed, or the sarcosine is applied to the plant or seed separate from the fertilizer.

14. The method of claim 1, wherein the fertilizer and sarcosine are applied directly to the plant or seed or applied to the plant or seed indirectly via application to soil.

* * * * *